United States Patent Office 3,296,307
Patented Jan. 3, 1967

3,296,307
PRODUCTION OF MONOALKYLHYDRAZINES
Rob R. MacGregor, Hopewell, and William P. Moore, Jr., Chester, Va., assignors to Allied Chemical Corporation, New York, N.Y., a corporation of New York
No Drawing. Filed Sept. 27, 1962, Ser. No. 226,714
3 Claims. (Cl. 260—583)

This invention relates to the production of monoalkylhydrazines and more particularly to the production of N-alkylacyl hydrazide precursors of monoalkylhydrazines.

The monoalkylhydrazines, especially monomethylhydrazine, are useful as high energy fuels in the guided missile and rocket field.

It has been proposed to prepare the monoalkylhydrazines by the hydrogenation of N-nitroso-N-methylurea or N-nitroso-N,N'-dimethylurea with the aid of a platinum catalyst to the corresponding amino compound, e.g., N-methyl carbazide, and by hydrolysis of the carbazide to monomethylhydrazine.

The above procedure is efficient and satisfactory in producing good yields of desired monomethylhydrazine, but it not only employs an expensive starting material in using a urea derivative, but is wasteful in that the by-product alkylamine produced in the reaction is discarded.

It is, therefore, an object of the present invention to provide a process for producing monoalkylhydrazines, especially monomethylhydrazine, which is economical and efficient.

It is a further object of the invention to provide a process for producing monoalkylhydrazines from inexpensive starting materials.

It is a still further object of the invention to provide a process for producing monoalkylhydrazines which permits economies due to recovery and/or recycling of by-products of the reaction.

Another object of the invention is to provide a process for producing N-alkylacylhydrazides precursors of N-alkylhydrazines.

These and other objects are accomplished according to our invention wherein an N-nitroso-N-alkylacylamide is catalytically hydrogenated to the corresponding N-alkyl-acylhydrazide in an acidic reaction medium in the presence of particulate catalytic materials comprising a group VIII metal selected from rhodium, platinum and nickel. Most effective catalysts are rhodium on carbon or alumina of either fixed bed or slurry type, platinum on carbon or alumina, in fixed bed type catalyst and Raney or sponge nickel. The acidic medium is provided by the presence of a lower saturated monocarboxylic acid having from 1–4 carbon atoms, i.e., formic, acetic, propionic or butyric acid, or mixtures thereof in solutions in water or a lower alkanol of 1–3 carbon atoms, in acid concentrations between about 1% and about 90% using sufficient solution to provide a mol ratio of acid to N-nitroso-N-alkylacylamide between about 1:1 and about 30:1. Such solutions usually have pH values between about 3 and about 5. However, the more important feature in the realization of good yields is the mol ratio as stated above.

The process according to our invention is illustrated by the following equation:

(1) 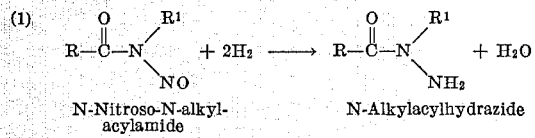
N-Nitroso-N-alkyl-    N-Alkylacylhydrazide
 acylamide wherein R and R¹ are lower alkyl groups having from 1 to 4 carbon atoms.

The resulting alkylacylhydrazide can be hydrolyzed in an alkaline medium such as with caustic alkali to produce the corresponding monoalkylhydrazine according to Equation 2 below:

(2) 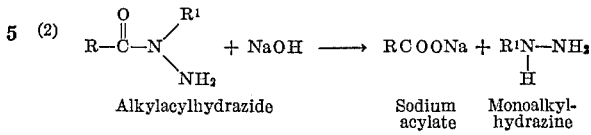
Alkylacylhydrazide    Sodium     Monoalkyl-
                      acylate    hydrazine wherein R and R¹ are as above defined.

The alkali acylate formed as a by-product in Equation 2 is readily converted to aliphatic acid by treatment with a mineral acid as shown in Equation 3 below, and is available for reuse.

(3)  $RCOONa + \tfrac{1}{2}H_2SO_4 \longrightarrow RCOOH + \tfrac{1}{2}Na_2SO_4$
Sodium      Sulfuric     Aliphatic    Sodium
acylate     acid         acid         sulfate The N-nitroso-N-alkylacylamides which form the starting material of our process, are themselves readily prepared from inexpensive starting materials, namely, the lower aliphatic acids and the monoalkylamines, particularly acetic acid and monomethylamine as illustrated in the following Equations a and b below which show a the formation of N-alkylacylamide by reaction of a lower aliphatic acid with a monoalkylamine, b nitrosation of N-alkylacylamide to N-nitroso-N-alkylacylamide.

(a) 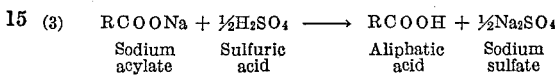
Aliphatic   Monoalkyl-    N-alkyl-
 acid        amine         acylamide (b) 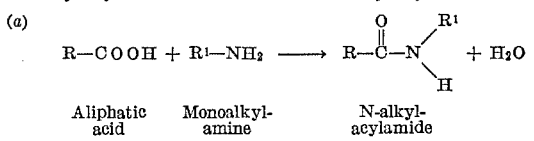
N-alkyl-
acylamide

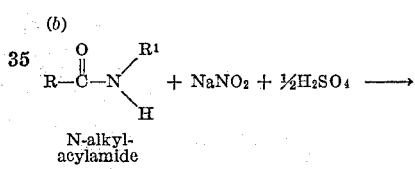
N-Nitroso-N-
alkylacylamide

The process of our invention is applicable to the production of the lower alkylhydrazines wherein the alkyl group is a saturated alkyl group containing 1–4 carbon atoms. It is especially adapted for the production of monomethylhydrazine.

Suitable N-nitroso-N-alkylacylamides used as starting materials are those in which the alkyl groups and acyl groups have from 1 to 4 carbon atoms inclusive, for example, N-nitroso-N - methylacetamide; N-nitroso-N-methyl formamide; N-nitroso-N-methyl propionamide; N-nitroso-N-methyl butyramide; N-nitroso-N-ethylacetamide; N-nitroso-N-propylacetamide; N-nitroso-N-butyl-acetamide; N-nitroso-N-ethyl formamide; N-nitroso-N-ethyl propionamide; N-nitroso-N-ethyl butyramide; N-nitroso-N-propyl formamide; N-nitroso-N-propyl propionamide; N-nitroso-N-propyl butyramide; N-nitroso-N-butyl formamide; N-nitroso-N-butyl propionamide and N-nitroso-N-butyl-butyramide.

In carrying out the process according to the preferred embodiments of our invention, the N-nitroso-N-alkylacylamide (which is a water-insoluble oil) is dissolved in sufficient lower saturated aliphatic carboxylic acid solution to provide a mol ratio of carboxylic acid to N-nitroso-N-alkylacylamide between about 1:1 and about 30:1, preferably between about 5:1 and about 12:1, and preferably to produce a solution of the N-nitroso-N- alkylacylamide having a concentration of at least about 2%, preferably between about 5% and about 10%, in general quantities up to 30% concentration or higher may advantageously be used. Catalyst is added to the solution and the resulting mixture is placed in an autoclave or fed to a hydrogenation system under suitable hydrogen pressure, for example, between about 50 p.s.i.g. and about 3,000 p.s.i.g. at temperatures between about 0° C. and about 40° C., preferably between about 5° C. and about 30° C. When hydrogenation is complete the resulting N-alkylacylhydrazide is freed from catalyst and hydrolyzed as by refluxing with sodium hydroxide solution, to convert the hydrazide to monoalkylhydrazine and sodium salt of the carboxylic acid corresponding to the acyl group. The carboxylic acid can be recovered by reaction with a mineral acid such as sulfuric acid and can be reused.

When the hydrogenation process of our invention is used as a step in the overall process of preparing monoalkylhydrazine from an aliphatic carboxylic acid and an alkylamine it presents the advantages not only of using inexpensive starting materials but results in the regeneration of one of the initial reactants. Thus, in the manufacture of monomethylhydrazine, (1) acetic acid and methylamine are reacted to produce N-methylacetamide; (2) N-methylacetamide is subjected to nitrosation with sodium nitrite and sulfuric acid to produce N-nitroso-N-methylacetamide; (3) N-nitroso-N-methylacetamide is hydrogenated to produce acetyl methyl hydrazide; (4) the hydrazide is hydrolyzed to produce sodium acetate and desired product monomethylhydrazine; (5) the by-product sodium acetate is reacted with acid to recover acetic acid. In such a process, the overall yield, based on monomethylamine fed is on the order of 76% with approximate consumption of raw materials per ton of monomethylhydrazine product, monomethylamine 0.88 ton, acetic acid 0.033 ton; sodium nitrate 2.96 tons; sulfuric acid 3.49 tons; caustic 1.13 ton; hydrogen 0.11 ton.

Acid concentration is important for the success of the hydrogenation process, and the concentration must be sufficiently high to maintain the N-nitroso-N-alkylacylamide in solution and to dissolve the resulting hydrazide product. The acid should be present as a solution in water or a lower alkanol of 1-3 carbon atoms. Water is preferred because its presence appears to promote the hydrogenation reaction and yields of N-alkylacylhydrazides are markedly higher when water is used as the acid carrier than when an alkanol is used, and use of alkanol alone results in virtually no conversion to hydrazide. Water alone is not a suitable reaction medium because of the virtual insolubility of the N-nitroso-N-alkylacylamides in water. In carrying out the reaction sufficient water should be present even when an alkanol is used as the primary reaction medium to promote the hydrogenation reaction since in the absence of water yields of N-alkylacylhydrazides are reduced.

Acid concentrations of at least about 1% are necessary for adequate solubility of the N-nitroso-N-alkylacylamide and resulting hydrazide and to promote the hydrogenation reaction, while water required to promote the best hydrogenation reactions is provided by a water content of about 10% or above. Accordingly, we used acid concentrations in the range between about 1% and about 90%, preferably between about 10% and about 65%.

Any of the lower saturated aliphatic carboxylic acids as defined can be used as solvent medium in the hydrogenation of any of the N-nitroso-N-alkylacylamides of our invention as defined. However, for convenience in operation and recovery it is often expedient to use an aliphatic acid solvent medium which corresponds to the acyl group of the N-nitroso-N-alkylacylamide being hydrogenated.

As brought out above, instead of aqueous solutions of acid hydrogenation solvent medium we may use lower aliphatic alcohol solutions, for example, methanolacetic acid mixtures in the same concentration ranges as those specified for the aqueous solutions. However, yields of hydrazide product are substantially less than when aqueous acid is used.

Thus our acidic reaction medium may be a solution of a carboxylic acid as defined in a polar liquid of the formula $$R^2\text{—OH}$$

wherein $R^2$ is hydrogen or an alkyl group of 1–3 carbon atoms, preferably methanol.

The following specific examples further illustrate our invention. Parts are by weight except as otherwise noted.

*Example 1*

20.5 parts N-nitroso-N-methylacetamide were dissolved in 120 parts of acetic acid and 120 parts of distilled water. Two parts of —200 mesh, 5 wt. percent rhodium on carbon were added and the mixture was placed in a stirred autoclave. The reactor was purged with nitrogen and pressured to 300 p.s.i.g. with hydrogen. After 175 minutes reaction time at 8° C., the product contained 0.68 wt. percent unreacted N-nitroso-N-methylacetamide and 4.71 wt. percent N-methyl-acetylhydrazide which represents 69% of theoretical yield (based on N-nitroso-N-methylacetamide charged). Hydrolysis of this product by refluxing with sodium hydroxide provides recovery of 95% of the hydrazide as monomethylhydrazine.

*Example 2*

17.1 parts N-nitroso-N-methylacetamide were dissolved in 120 parts acetic acid and 123 parts of distilled water. 2.0 parts of —200 mesh, 5 wt. percent rhodium on alumina were added and the mixture was placed in a stirred autoclave. The reactor was purged and pressured to 500 p.s.i.g. with hydrogen. After 60 minutes reaction time at 27° C. the product was found to contain 1.26 wt. percent unreacted N-nitroso-N-methylacetamide and 3.98 wt. percent N-methylacetylhydrazide. This represents 70.1% of theoretical hydrazide yield.

*Example 3*

20 parts N-nitroso-N-methylacetamide were dissolved in 120 parts of acetic acid and 120 parts of distilled water. 15 parts of 0.5 wt. percent platinum on 1/16 inch alumina extrusions were added and the mixture placed in a rocking autoclave. The hydrogenation was conducted at 1600 p.s.i.g. and 24° C. After 138 minutes the product contained 0.69 wt. percent N-nitroso-N-methylacetamide and 4.51 wt. percent N-methylacetylhydrazide. Yield was 66.3% of theory. The product was hydrolyzed to methyl hydrazine as in Example 1.

*Example 4*

27.6 parts N-nitroso-N-methylacetamide were dissolved in 120 parts acetic acid and 123 parts distilled water. 15 parts of 2% platinum on 4–8 mesh carbon were added and the reduction performed as in Example 3. The reaction pressure was 1900 p.s.i.g. and the temperature was 25° C. After 60 minutes the product contained 0.57 wt. percent of the nitroso compound and 2.05 wt. percent N-methylacetylhydrazide which represents a yield 23.3% of theory.

*Example 5*

18.3 parts of N-nitroso-N-methylacetamide were dissolved in 120 parts acetic acid and 122 parts distilled water. 3.0 parts of fresh Raney nickel were added and the slurry placed in a rocking autoclave. The hydrogenation was allowed to proceed at 300 p.s.i.g. and 24° C. for 100 minutes. The product analyzed 1.13 wt. percent N-nitroso-N-methylacetamide and 4.11 wt. percent N-methylacetylhydrazide. The yield of hydrazide was 67.5% of theory.

Example 6

20 parts of N-nitroso-N-methylacetamide were added to 160 parts methanol and 20 parts acetic acid. The reduction carried out at 500 p.s.i.g. and 25° C. The 2 parts of the catalyst of Example 1 were added and the reduction carried out at 500 p.s.i.g. and 25° C. The product contained 2.83 wt. percent N-nitroso-N-methylacetamide and 3.6 wt. percent N-methylacetylhydrazide. The conversion to the hydrazide was 45% of theory.

While the above describes the preferred embodiments of our invention, it will be understood that departures may be made therefrom within the scope of the specification and claims.

We claim:
1. A process for the production of a monoalkylhydrazine of the formula

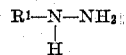

wherein $R^1$ is an alkyl radical containing 1–4 carbon atoms, which comprises contacting an alkaline medium with an N-alkylacylhydrazide of the formula

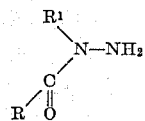

wherein R has the same definition as $R^1$ but is independent therefrom.

2. The process of claim 1, wherein the alkaline medium is a sodium hydroxide solution.

3. The process of claim 2, wherein R and $R^1$ are methyl radicals.

References Cited by the Examiner
UNITED STATES PATENTS

| | | | |
|---|---|---|---|
| 3,005,027 | 10/1961 | Druey et al. | 260—583 |
| 3,022,345 | 2/1962 | Szmuszkovicz | 260—561 |
| 3,023,241 | 2/1962 | Twelves | 260—561 |
| 3,050,560 | 8/1962 | Randolph et al. | 260—583 |
| 3,102,887 | 9/1963 | Thatcher | 260—569 |
| 3,113,152 | 12/1963 | Horvitz | 260—583 |
| 3,129,263 | 4/1964 | Feldman et al. | 260—569 |
| 3,167,588 | 1/1965 | Moore et al. | 260—583 |

FOREIGN PATENTS

| | | |
|---|---|---|
| 577,535 | 6/1959 | Canada. |
| 797,483 | 7/1958 | Great Britain. |

OTHER REFERENCES

Blatt: "Organic Synthesis Collective," vol. 2, pp. 418–19, New York, Wiley, 1943.

WALTER A. MODANCE, *Primary Examiner.*

J. W. WHITSLER, NATALIE TROUSOF,
*Assistant Examiners.*